United States Patent
Satou

(10) Patent No.: US 6,988,490 B2
(45) Date of Patent: Jan. 24, 2006

(54) ENGINE FUEL INJECTION CONTROL SYSTEM

(75) Inventor: Fumikazu Satou, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/030,095

(22) Filed: Jan. 7, 2005

(65) Prior Publication Data

US 2005/0178360 A1  Aug. 18, 2005

(30) Foreign Application Priority Data

Jan. 13, 2004  (JP) .............................. 2004-005935

(51) Int. Cl.
*B02B 3/00* (2006.01)

(52) U.S. Cl. ...................... 123/480; 123/299; 123/698; 123/673; 123/431; 701/103

(58) Field of Classification Search ................ 123/480, 123/299, 300, 305, 672, 673, 698, 431; 701/109, 701/103–105
See application file for complete search history.

(56) References Cited

U.S. PATENT DOCUMENTS

| | | | |
|---|---|---|---|
| 5,063,886 A | | 11/1991 | Kanamaru et al. |
| 5,875,743 A | * | 3/1999 | Dickey ..................... 123/25 C |
| 6,314,940 B1 | | 11/2001 | Frey et al. |
| 6,640,785 B2 | * | 11/2003 | Almkvist .................... 123/492 |
| 6,786,201 B2 | * | 9/2004 | Ohtani ........................ 123/431 |
| 6,813,880 B2 | * | 11/2004 | Nishiyama et al. ........... 60/285 |
| 6,928,983 B2 | * | 8/2005 | Mashiki ...................... 123/431 |
| 2004/0149255 A1 | | 8/2004 | zur Loye et al. |

FOREIGN PATENT DOCUMENTS

| | | |
|---|---|---|
| EP | 0 947 684 A2 | 10/1999 |
| EP | 1 039 112 A2 | 9/2000 |
| JP | A 63-138120 | 6/1988 |
| JP | A 05-231221 | 9/1993 |
| JP | A 07-103050 | 4/1995 |
| JP | A 2000-213398 | 8/2000 |
| JP | A 2002-364409 | 12/2002 |

* cited by examiner

*Primary Examiner*—Hai Huynh
(74) *Attorney, Agent, or Firm*—Oliff & Berridge, PLC

(57) ABSTRACT

A system for controlling fuel injection in an engine. The engine includes an intake passage, an intake passage injector, a cylinder having a combustion chamber, and a cylinder injector for injecting a target amount of fuel into the combustion chamber. The system includes a controller for controlling the intake passage and cylinder injectors to permit fuel injection, each with an injection ratio, while said engine operates in a condition in which said engine permits fuel injection from said cylinder injector, a sensor for sensing the amount of fuel injected from the cylinder injector, a detector for detecting the difference between the target injection amount and the amount of fuel injected and an adjuster for adjusting the injection ratio based on the result of the detection by the detector so that the intake passage injector performs fuel injection together with the fuel injection performed by the cylinder injector.

12 Claims, 4 Drawing Sheets initial change of condition after time

ENGINE FUEL INJECTION CONTROL SYSTEM

BACKGROUND OF THE INVENTION

The present invention relates to a system for controlling fuel injection in an internal combustion engine that has a cylinder injector for directly injecting fuel into a combustion chamber defined inside a cylinder, and a port injector for injecting fuel into an air-intake passage.

Conventionally, fuel injection into the intake passage, such as an intake port (hereinafter referred to as "port injection"), has been widely used for supplying fuel into the combustion chamber. In the port injection, the fuel is injected into a passage upstream of the intake valve that is disposed at the entrance of the cylinder. The fuel injected in this manner is introduced into the combustion chamber during the suction stroke of the cylinder in a mixed state substantially uniformly with the air.

On the other hand as an alternative injection method, direct injection of the fuel into the cylinder (hereinafter referred to as "cylinder injection") has recently been suggested. In the cylinder injection, the fuel injection pressure is set comparatively higher than that in the case of using port injection to inject the fuel in an atomized state. The atomized fuel can be easily vaporized. In the cylinder injection, the temperature within the combustion chamber can be reduced by the vaporization heat as the vaporization of the atomized fuel occurs. Because the temperature inside the cylinder is reduced, the suction efficiency is improved and results in the increase in engine output.

In the cylinder injection method, deposits due to soot or particulate matter after fuel combustion can be accumulated in the vicinity of the fuel injection orifice because the tip of the injector is exposed within the combustion chamber. The accumulation of the deposits can decrease the amount of fuel injected and can change the injection conditions after time so that the combustion state can be deteriorated.

Accordingly, as described in Japanese Patent Laid-Open Application 63-138120, the injection method can be compulsorily transferred from the cylinder injection to the port injection after a predetermined period though the engine is in operation under conditions that enable cylinder injection. By forcibly switching the combustion injection method in this way, the temperature at the tip of the cylinder injector is increased to enable periodical burning of the accumulated deposits to reduce the accumulation.

However, the periodic transfer between the injection methods cannot perform appropriate transfer between the injection methods responsive to the amount of the accumulated deposits because the changeover can take place even when the deposits have not yet actually accumulated. Further, because the cylinder injection is discontinued when totally switching the injection method to the port injection, the advantageous effect of cylinder injection, such as improved suction efficiency due to reduced chamber temperature, cannot be obtained.

In addition, the disadvantages such as decrease in the fuel injection amount and the change in the form of atomized vapor are not always caused by deposit accumulation. Rather, such disadvantageous effects can also be caused by other factors, for example the decrease in the fuel injection pressure by some malfunction of the injector.

BRIEF SUMMARY OF THE INVENTION

In order to solve the problems described above, an object of the invention is to suppress deterioration in the combustion states by adjusting an appropriate fuel injection method to comply with the combustion state even when the circumstances would not permit normal fuel injection from cylinder injector due to causes such as deposit accumulation, as well as ensuring the effect of suction efficiency improvement by cylinder injection to a maximum extent.

In order to achieve the above objective, the present invention provides a system for controlling fuel injection in a combustion engine. The combustion engine has a cylinder and an intake passage connected to the cylinder. A first injector injects fuel into the cylinder. A second injector injects fuel into the intake passage. The fuel injection by the first injector and the second injector is controlled based on a respectively predetermined injection ratio. The system comprises a sensor for sensing an actual amount of fuel injected from said first injector. The system further comprises a controller for determining a deviation of the actual injection amount from a predetermined target injection amount, correcting at least one of said injection ratios based on the deviation, and actuating said second injector to perform fuel injection together with the first injector.

In one aspect, the injection ratio of the intake passage injector is increased based on the detection that the amount of fuel injected is liable to be lower than the target injection amount.

In this structure, the difference between the target injection amount and the amount of fuel actually injected from the cylinder injector 17 is detected. The injection ratios of the cylinder injector 17 and the port injector 18 are adjusted based on the detected deviation so that the fuel injection from the port injector 18 is performed in addition to the fuel injection from the cylinder injector 17 while the operation state of the internal combustion engine is suitable for fuel injection from the cylinder injector 17. Accordingly, even in the case where the amount actually injected from the cylinder injector can be lower than the target injection amount, for example due to deposit accumulation at the cylinder injector 17, the fuel injection methods can be appropriately adjusted to comply with the circumstances. Accordingly, the deterioration in the combustion states can be suppressed while the effect of increased suction efficiency due to cylinder injection can be retained at a maximum extent.

In particular, the above-described system can compensate the fuel injection by the port injector 18 by increasing the injection ratio of the port injector 18 based on the detection that the actual amount injected from the cylinder injector 17 is liable to be lower than the target amount even in the case where the flow rate is reduced by causes such as deposit accumulation.

Alternatively, by adopting an arrangement to decrease the injection ratio of the port injector 18 based on the detection that the actually injected amount from the cylinder injector 17 is liable to be higher than the target injection amount, the fuel injection from the cylinder injector 17 can be increased responsive to conditions such as elimination of deposits, so that the advantageous effect of increased suction efficiency due to cylinder injection can be ensured.

Note that the phrase "while said engine operates in a condition in which said engine permits fuel injection from said cylinder injector," includes both the circumstances where the fuel injection is performed, only by either the cylinder injector 17 and by the port injector 18 in addition to the cylinder injector 17.

In another aspect of the above-described system according to the invention, the deviation is determined based on a correction value obtained from air fuel ratio control of the cylinder injector and the injection ratios are established based on the correction value.

In the period where the fuel injection is performed only by the cylinder injector 17, the target injection amount of the cylinder injector 17 is identical to the basic injection amount established in accordance with the engine operation state. If the actually injected amount from the cylinder injector 17 is different from the basic injection amount during this period, a feedback correction value is set through the air fuel ratio control to eliminate the difference. Further, also in the periods where the port injector 18 is used in addition to the cylinder injector 17, the difference between the actual injection amount and the target amount is similarly reflected in the feedback correction value. Accordingly, the feedback correction value is a value which reflects the tendency between the actual injection amount and the basic injection amount of the injectors 17 and 18 to differ.

In the above-described structure, the injection ratios can be established to be conformal to the circumstances that take place in the cylinder injector, such as the deposit accumulation, because the injection ratio of each injector can be set based on the feedback correction value.

The correction value in the air fuel ratio control can be also changed due to other circumstances than in the case where the cylinder injector 17 is no longer capable of fulfilling its original function due to for example deposit accumulation, and the correction value can change, for example by rapid change in the engine operation states. Here, while the change in the correction value due to the rapid change in the engine operation state is of a temporary nature, the change in the correction value due to deposit accumulation is comparatively slack and has a stationary tendency.

Accordingly, in a further aspect of the invention, the correction value is a learning value which is learnt responsive to the tendency which is constantly observed in the deviation of the target injection amount from the actual amount of fuel injected. In this structure, the injection ratios can be appropriately corrected in accordance with the correction value, while avoiding the effect of temporary disturbance such as rapid change in the engine operation.

In a still further aspect, the injection ratios can be variably established responsive to the amount of the correction value when the controller corrects the injection ratios based on the correction value.

In this structure, the injection ratios can further appropriately be corrected responsive to the degradation of the functions when the cylinder injector 17 is in a state where it is no longer fulfilling its original functions, for example, due to deposit accumulation.

Further, when the injection ratios are established responsive to the correction value as described above, the controller can reset the learning value when the learning value diverges from a predetermined range and reflects said learning value for adjustment of said injection ratios. Note that the "predetermined range" is preferably set at a level that enables determination that the fuel injection function of the cylinder injector 17 has been changed to an extent that it cannot be ignored due to, for example, deposit accumulation.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the invention is described below by referring to FIGS. 1 to 4.

Figure 1:
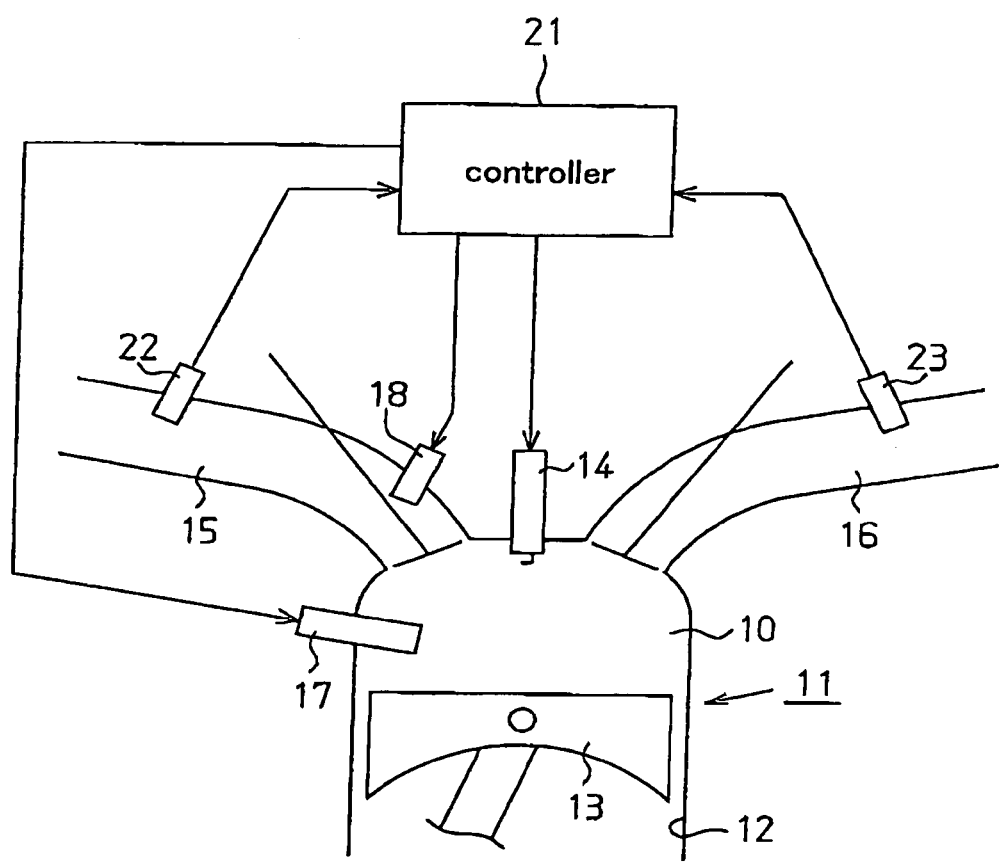
FIG. 1 is a block diagram which schematically shows a fuel injection control system in an embodiment in accordance with the invention.

FIG. 1 schematically shows a system for controlling fuel injection of the engine in an embodiment according to the invention. A piston 13 is disposed within the cylinder 12 of the engine 11. The intake passage 15 and an exhaust passage 16 are respectively connected to the combustion chamber 10 defined by the piston 13.

The intake passage injector 18 is provided on the intake passage 15 for injecting fuel into the intake passage 15. The cylinder injector 17 is provided on the cylinder 12 in a manner in which the tip of the injector is exposed within the combustion chamber 10 so that fuel can be directly injected from the orifice (not shown in the figures) of the cylinder injector 17 into the combustion chamber 10. The fuel thus injected from the intake passage injector 18 or the cylinder injector 17 are mixed with the suction air introduced into the combustion chamber 10 through the intake passage 15. The mixed air is burned in the combustion chamber 10 by operation of the ignition plug 14 and is then exhausted through the exhaust passage 16 from the combustion chamber 10.

An air flow meter 22 is disposed in the intake passage 15 for detecting the amount of suction air. An oxygen sensor 23 is disposed in the exhaust passage 16 for detecting the oxygen concentration of the exhaust. In addition, a rotational speed sensor 24 for detecting the rotational speed of the engine 11 is provided in the vicinity of the crankshaft (not shown in the figures). The signals detected by the sensors 22 to 24 are inputted to the controller 21 of the engine 11. The controller 21 then calculates the amount of suction air introduced into the combustion chamber 10 per stroke, fuel injection, and air/fuel ratio, etc., based on the detected signals. The controller 21 then sets the fuel injection method based on the engine operation states such as rotational speed and engine load (amount of suction air or fuel injection). More particularly, the fuel injection method is adjusted to any one of, fuel injection by port injector 18 alone, fuel injection by cylinder injector 17 alone and fuel injection by both of the injectors 17 and 18. In particular, the fuel injection method is set so that the fuel is injected at least from the cylinder injector 17 in order to obtain suction efficiency improvement from the fuel injection, while the engine is operating at a high load.

Further, the controller 21 calculates a basic injection amount based on the operation state of the engine 11 so that the air fuel ratio reaches a target air fuel ratio (theoretical air fuel ratio in general), and further corrects the basic injection according to the oxygen concentration in the exhaust gas to perform so-called air fuel ratio control. The steps for performing the air fuel ratio control is described below.

In the air fuel control, the basic injection amount QB is calculated on the assumption that the air fuel ratio is a theoretically calculated ratio based on the state of engine operation such as the engine load (for example the amount of suction air) and engine rotational speed. Because the fuel injection system is affected by various disturbances, fuel injection cannot be performed in some cases in a manner complying with the actual engine operation state depending upon the thus calculated basic injection amount QB. For example, while the engine is in a transient operation such as during acceleration and deceleration of the engine 11 in which the suction air amount drastically changes, the actual air fuel ratio may not correspond to the theoretical air fuel ratio though the fuel injection is performed based on the calculation of the basic injection amount QB that has been obtained from the already detected suction air amount. The same can be said in the case where the fuel injection cannot be performed properly because of the accumulation of the deposits on the tip of the injector, specifically the injector orifice (not shown in the figures) of the cylinder injector 17 (see FIG. 4) and in the case where the injection pressure has decreased by malfunction of the fuel pressure feeding system of the cylinder injector 17.

Accordingly, the air fuel ratio control in general performs feedback control to compensate for the influence from the disturbances. That is, the control unit 21 calculates a correction coefficient, FAF, (initial value "1.0") based on the deviation between the theoretical air fuel ratio and the actual air fuel ratio. Here, the actual air fuel ratio is calculated based upon detection of the oxygen sensor 23. The fuel injection amount is thereby corrected to minimize the deviation by multiplying the correction coefficient FAF by the basic injection amount QB.

Specifically, in the case where the oxygen concentration in the exhaust gas is lower than the reference value that corresponds with the theoretical air fuel ratio, in other words, in the case of a so-called "rich" state, the correction coefficient FAF is set at a smaller value than the initial value 1.0 in order to decrease the fuel injection. On the other hand, in the case where the oxygen concentration is high, namely in the case of a so-called "lean" state, the correction efficient FAF is set at a greater value than 1.0 in order to increase the fuel injection.

The feedback control further calculates a learning value, KG, in order to learn or determine the tendency of the correction coefficient FAF to remain stationary or constant and to reflect the result of learning in the correction of the fuel injection. The learning value KG is a correction coefficient for correcting the basic injection amount QB that has been corrected by the correction coefficient FAF in an operation of [QB·FAF·(1+KG)] whose initial value is "0," and is indicative of the stationary differentiating tendency between the actual injection amount and the basic injection amount QB.

Specifically, an average FAFAVE is calculated for the correction coefficient FAF in a certain period. When the average FAFAVE exceeds a predetermined lean reference value (>1.0), a predetermined amount α is added to the leaning value KG and at the same time the value α is subtracted from the correction coefficient FAF. When the average FAFAVE lowers a predetermined rich reference value (<1.0), the predetermined value α is subtracted from the leaning value KG and at the same time the value α is added to the correction coefficient FAF. Note that in the case where the actual air fuel ratio substantially matches the theoretical air fuel ratio so that the average FAFAVE of the correction coefficient FAF is in between the rich and lean reference values, the learning value KG is set to maintain the learning value KG at that moment.

Here if the actual injection amount of the injectors 17 and 18 have a stationary tendency to be lower than the basic injection amount QB, for example due to the deposit accumulation at the cylinder injector 17, the learning value KG will be a greater value than the initial value of zero by an amount complying with the tendency for the decrease. Alternatively, when the accumulated deposits on the cylinder injector 17 are burnt down to thereby enable normal fuel injection by the cylinder injector 17, the above described learning value KG is gradually decreased. Accordingly, the degree of deposit accumulation on the cylinder injector 17 can be monitored based upon the learning value KG.

The control system variably sets the injection ratio of the injectors 17 and 18 responsive to the degree of deposit accumulation so that the fuel injection is performed by the port injector 18 together with the fuel injection by the cylinder injector 17 when the engine operation is in a state where fuel injection is performed, at least by the cylinder injector 17. The fuel injection control is described in more detail below.

Figure 2:
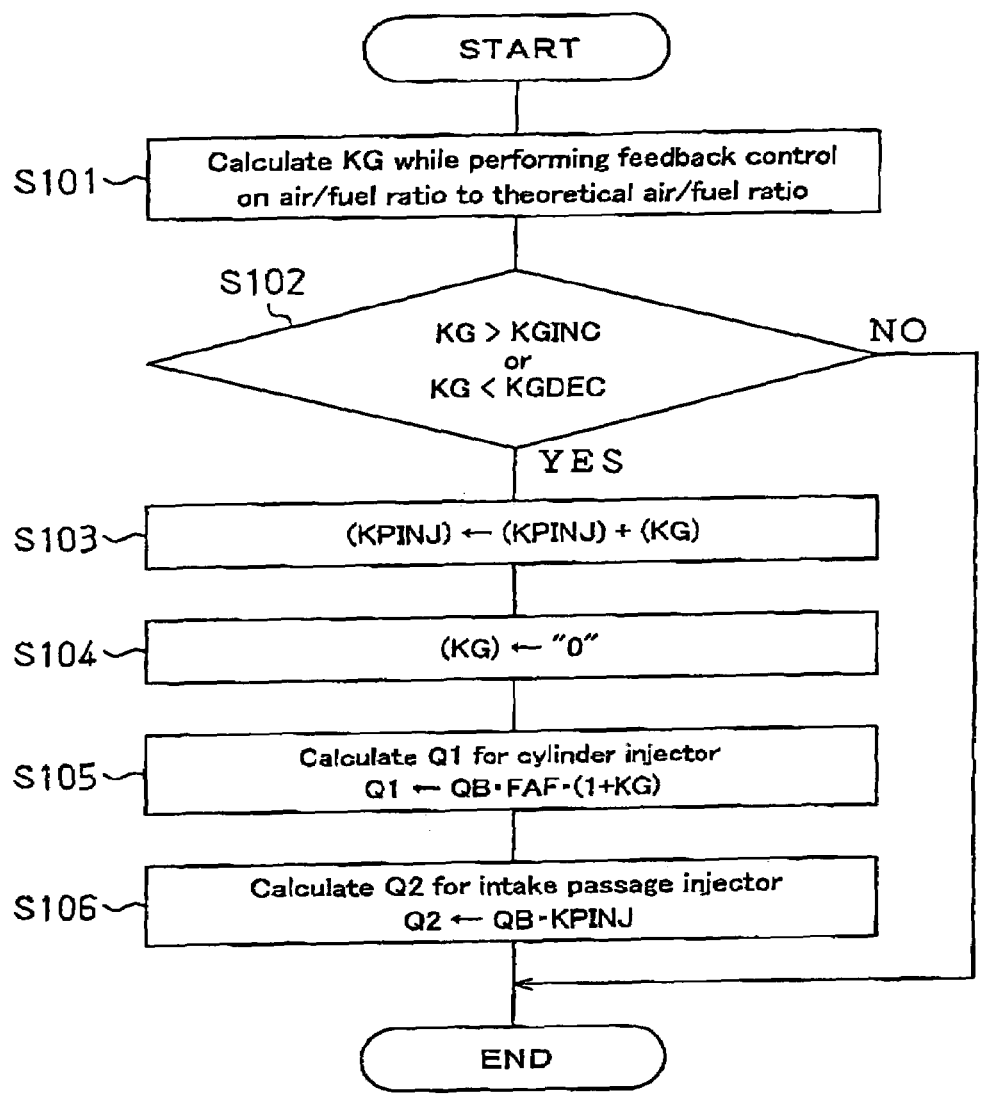
FIG. 2 is a flow chart schematically showing the fuel amount control according to the foregoing embodiment.

FIG. 2 shows a flowchart which depicts the steps for the fuel injection control. The controller 21 repeatedly performs the series of the steps shown in the flowchart after a predetermined control periods. Note that the case of starting the series of steps from the state where the engine operation is in a state where the fuel injection is being performed only by the cylinder injector 17.

In step S101, the controller 21 calculates the correction coefficient FAF in order to feedback the actual injection of the cylinder injector 17 so that the air fuel ratio is a theoretical value. The learning value KG is then calculated based upon the average FAFAVE of the correction efficient FAF.

Next in step S102, the controller 21 compares the reference values KGINC and KGDEC with the learning value KG to determine whether the conditions 1 and 2 shown below are fulfilled.

| Condition 1 | KG > KGINC |
|---|---|
| Condition 2 | KG < KGDEC |

Here, the reference value KGINC is a reference value for determining whether the influence by the deposits accumulated on the cylinder injector 17 orifice is not negligible (condition 1). The reference value KGDEC is a reference value for determining whether the deposits accumulated on the cylinder injector 17 orifice has been burnt down and the influence of the deposits on the fuel injection is now negligible (condition 2). Accordingly, the degree of difference between the actual injection amount of the cylinder injector 17 and the target amount is detected through the steps S101 and S102.

In step S102, the controller 21 discontinues the steps when neither of the conditions 1 and 2 are fulfilled.

On the other hand when one of the conditions 1 and 2 is fulfilled, in other words, either in the state that the cylinder injector orifice is subjected to the influence of a negligible amount of the accumulated deposits, or that the deposits have been burnt down so that the influence of the deposits on the fuel injection is negligible, the controller 21 proceeds to the step S103.

In the subsequent steps S103 and S104, the injection ratio KPINJ is updated through the operations (1) and (2) shown below.

$$\text{KPINJ} \leftarrow \text{KPINJ} + \text{KG} \quad (1)$$

$$\text{KG} \leftarrow 0 \quad (2)$$

The injection ratio KPINJ of equation (1) indicates the ratio of the fuel injected by the port injector 18 out of the basic injection amount QB. The initial value is set at zero.

In the steps S103 and S104, the learning value KG is a positive value when the deposits accumulate on the cylinder injector orifice sufficiently to create a tendency to lower the amount of fuel injected from the cylinder injector 17, compared to the normal state. Accordingly, the injection ratio KPINJ is set greater by the learning value KG at that moment in accordance with the operations (1) and (2), to increase the amount of fuel injected from the port injector 18 and to decrease the fuel injected from the cylinder injector 17.

On the other hand, when the deposits on the cylinder injector orifice is burnt down to transit the state of the cylinder injector 17 to enable normal injection, the learning value KG will be a negative value. Accordingly, the injection ratio KPINJ is decreased by the operations (1) and (2). Thereby, the amount of fuel injected from the port injector 18 is decreased, as well as the amount of fuel injected from the cylinder injector 17 is increased.

After thus calculating the injection ratio KPINJ and the learning value KG, the controller 21 then calculates the fuel injection amount Q1 of the cylinder injector 17 and the amount Q2 of the cylinder injector 18 based on the operations (3) and (4) shown below in steps S105 and S106.

$$Q1 \leftarrow QB \cdot FAF \cdot (1 + KG) \quad (3)$$

$$Q2 \leftarrow QB \cdot KPINJ \quad (4)$$

After calculating the fuel injection amount Q1 and Q2 for the injectors 17 and 18 to correspond to the state of deposit accumulation on the cylinder injector orifice as described above, the controller 21 discontinues the series of steps. Note that the steps starting from the state in which only the cylinder injector 17 is used in the above, it is also possible to detect the difference between the actual injection and the target injection amount of the cylinder injector 17 also when the port injector 18 is used for fuel injection as well as the cylinder injector 17, similarly through the steps S101 and S102.

Figure 3:
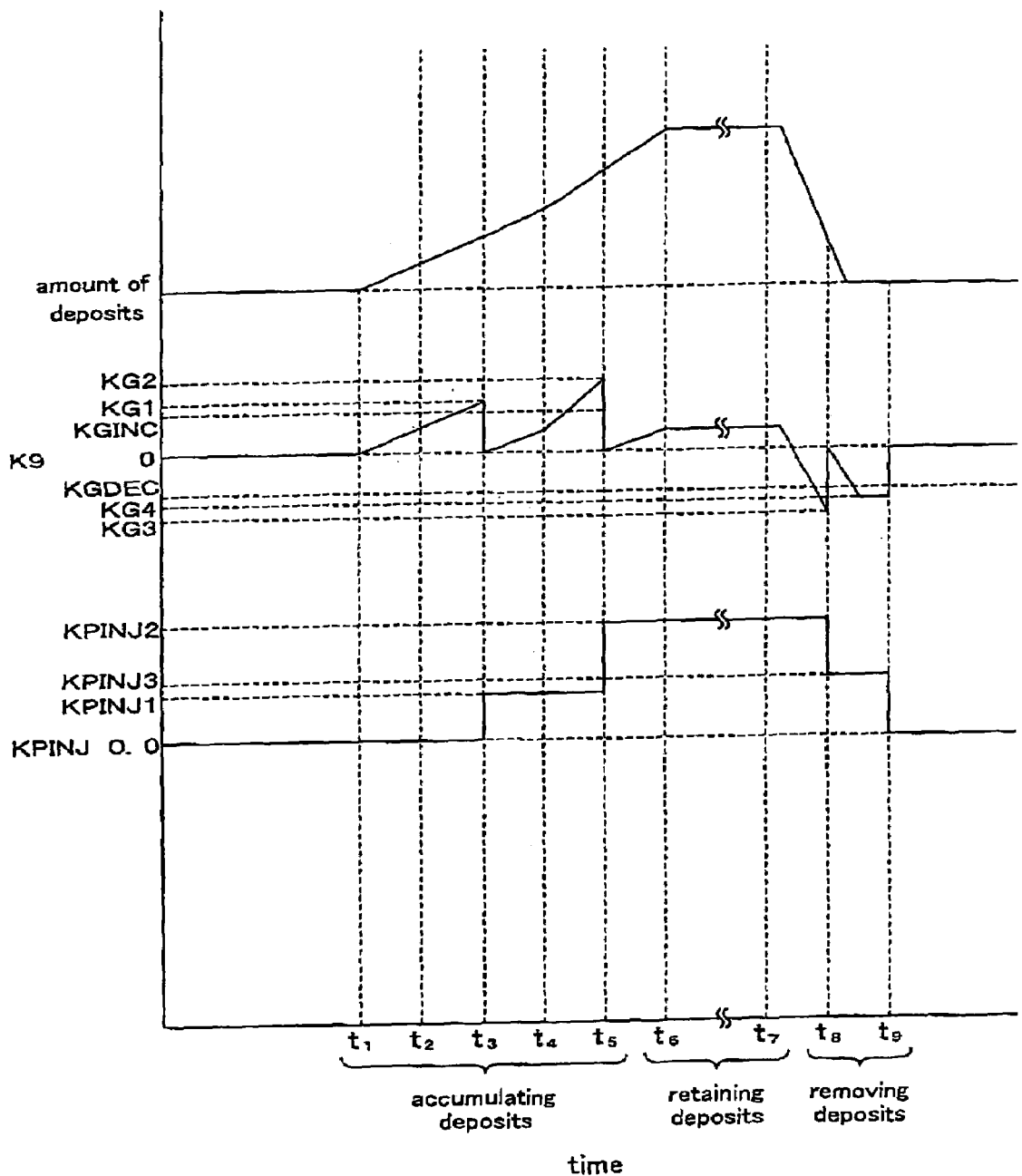
FIG. 3 is a timing chart showing the relationship between the deposit accumulation conditions and the fuel amount control.
Figure 4A:
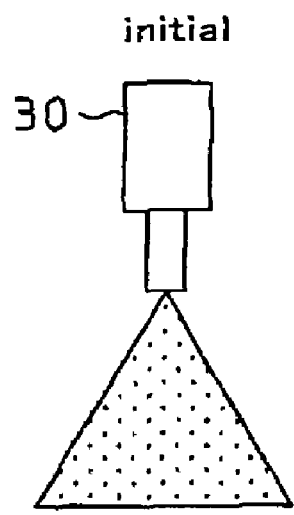
FIG. 4 is a schematic side elevational view of an injector orifice showing the change in conditions of injection due to deposit accumulation on the cylinder injector.
Figure 4B:
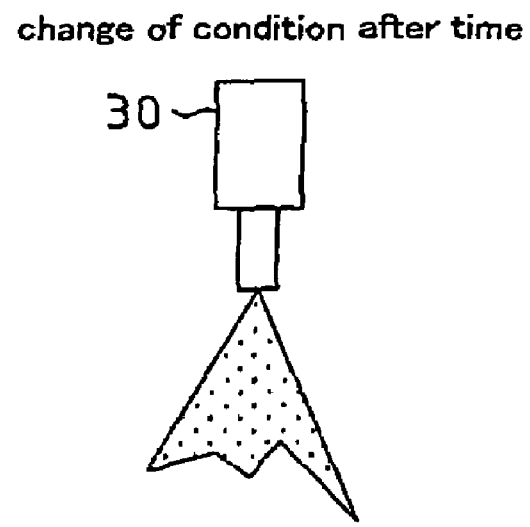

An embodiment for fuel injection control in accordance with the invention is next described by referring to the timing chart shown in FIG. 3. In the timing chart, a case in which the deposits are gradually accumulated at the orifice of the cylinder injector 17 and the deposits are then burnt down after a certain period is exemplified.

In the initial period between the timings t1 and t2, the fuel injection is performed only by the cylinder injector 17. In this time frame, the deposits are gradually accumulated on the orifice of the cylinder injector 17 and the actual fuel injection decreases by the effect of the deposits. In order to compensate for the effect, the learning value KG increases.

At the timing t2, since neither of the conditions 1 and 2 (step S102) is fulfilled, the injection ratio KPINJ is maintained at the initial value zero. Accordingly, the fuel injection state at this moment is performed continuously in the state in which only the cylinder injector 17 is used. Note however that the learning value KG gradually increases as the amount of deposit accumulation increases.

When condition 1 is fulfilled at the timing 3 (step S102: condition 1 is fulfilled), the injection ratio KPINJ from the port injector 18 increases by the learning value KG1 from its initial value zero, to be set at "KPINJ1." As a result, the fuel injection by the port injector 18 is started. On the other hand, the amount of the injection from the cylinder injector 17 is decreased by the amount injected from the port injector 18.

At timing t4, neither of the conditions 1 and 2 (step S102) is fulfilled. Accordingly, there is no change in the fuel injection amount injected by the port injector 18 in the period between timings t3 and t5. On the other hand, the amount of fuel injected by the cylinder injector 17 increases due to the increase in the learning value KG.

At timing t5 the learning value KG2 exceeds KGINC to fulfill the condition 1 of step S102. Accordingly, the injection ratio of the port injector 18 is increased by the learning value KG2 at this moment. On the other hand, the fuel injection ratio from the cylinder injector 17 decreases by the learning value KG2.

At timing t6, neither of the conditions 1 and 2 (step S102) is fulfilled. Therefore the injection ratio of the port injector 18 is not changed from KPINJ2. Similarly, since there is no change to the amount of deposit accumulation between the timings t6 and t7 and the learning value KG stays constant, the injection amount from the cylinder injector 17 is not changed.

When the deposits disappear by some cause, such as being burnt or dropped, for example the decrease in the amount of the deposit accumulation takes place as that shown in the period between timings t7 and t8, the fuel injection from the cylinder injector 17 increases. Accordingly, in order to decrease the fuel injection of the cylinder injector 17 to the reference value, the learning value KG decreases. The learning value KG3 at the timing t8 is lower than the reference value KGDEC so that the condition 2 is fulfilled. Accordingly at the timing t8, the learning value KG3 is added to the injection ratio KPINJ from the port injector 18. Since the learning value KG3 is a negative value, the fuel injection from the port injector 18 decreases. On the other hand, the injection ratio of the cylinder injector increases as the ratio is reduced by the learning value KG3.

When the deposit accumulation continues to decrease, the learning value KG4 at the timing t9 after the deposits are completely removed is also lower than the reference value KGDEC. Accordingly, the injection ratio of the port injector 18 is further decreased by KG4. As a result, KPINJ is lowered to zero and the injection method is altered to a manner in which only the cylinder injector 17 injects the entire amount of the fuel without using the port injector 18.

As described above the present invention performs the alteration of the fuel injection methods by using the learning value KG which depicts the combustion states at that moment. Since the fuel control of the present invention appropriately transfers the fuel injection method responsive to the engine operation and the conditions of the injectors 17 and 18, the advantageous effect of reducing temperature of the cylinder through the use of cylinder injector 17 and resultant increase in the suction amount can be obtained in accordance with the conditions while avoiding the disadvantages of the deposit accumulation by the use of the cylinder injector 17.

Further, the feedback alters the fuel injection ratio KPINJ between the cylinder injector 17 and the port injector 18 by using the learning value KG. By doing so, not only unnecessary switching between the cylinder injector 17 and the port injector 18 can be prevented, but also the fuel injection ratio KPINJ can be altered responsive to the absolute value of the learning value KG, rapidly when it is necessary to catch up with the rapid change of the circumstances and gradually when it is necessary to gradually change the injection method. Accordingly, the fuel injection ratios of the injectors 17 and 18 can be suitably adjusted to a state in a faster manner than the case of changing the ratio by a constant value.

It should be apparent to those skilled in the art that the present invention may be embodied in many other specific forms without departing from the spirit or scope of the invention. Particularly, it should be understood that the invention may be embodied in the following forms.

While the learning value KG was used as a parameter for monitoring the deposit accumulation, the correction coefficient FAF alone can be used or both of the feedback correction values FAF and KG can be used. The advantageous effects of the invention can be obtained provided that the fuel injection amount from each of the injectors 17 and 18 can be changed to comply with the circumstances by using the feedback correction value.

While there are KGINC and KGDEC for the reference value for comparison with the learning value KG in step S102, the absolute value of the KGINC and KGDEC can be the same or different.

In the step S103 of altering the fuel injection ratio KPINJ from the port injector 18, the learning value KG is added to the fuel injection ratio KPINJ. However, it is also possible to add only a portion of the learning value KG to the fuel injection ratio KPINJ, for example through an operation of multiplying a coefficient by the learning value KG.

The method of setting the learning value to zero after altering the fuel injection ratio KPINJ is described in step S104. While the absolute value of the learning value needs to be decreased after alteration of the injection ratio KPINJ, it need not necessarily be decreased to zero in alternate embodiments.

Therefore, the present examples and embodiments are to be considered as illustrative and not restrictive and the invention is not to be limited to the details given herein, but may be modified within the scope and equivalence of the appended claims.

What is claimed is:

1. A system for controlling fuel injection in a combustion engine having a cylinder and an intake passage connected to the cylinder, wherein a first injector injects fuel into the cylinder, a second injector injects fuel into the intake passage, and fuel injection by the first injector and the second injector is controlled based on a respectively predetermined injection ratio, said system comprising:
   a sensor for sensing an actual amount of fuel injected from said first injector; and
   a controller for:
      determining a deviation of the actual injection amount from a predetermined target injection amount;
      correcting at least one of said injection ratios based on the deviation; and
      actuating said second injector to perform fuel injection together with the first injector.

2. The system according to claim 1, wherein said controller increases the injection ratio of said second injector based on a determination that said actual injection amount has a tendency to fall below said target injection amount.

3. The system according to claim 1, wherein said controller determines a correction value for correcting the injection amount of the first and second injectors based on the deviation.

4. The system according to claim 3, wherein said correction value is a learnt value in accordance with a tendency in the deviation which is constantly observed.

5. The system according to claim 3, wherein said controller corrects said injection ratios responsive to the correction value.

6. The system according to claim 5, wherein if said learnt value is out of a predetermined range, said controller controls said injection ratio of said second injector based on the learnt value and resets said learnt value.

7. A system for controlling fuel injection in a combustion engine having a cylinder and an intake passage connected to the cylinder, wherein a first injector injects fuel into the cylinder, a second injector injects fuel into the intake passage, and fuel injection by the first injector and the second injector is controlled based on a respectively predetermined injection ratio, said system comprising:
   a sensor for sensing an actual amount of fuel injected from said first injector; and
   a controller for:
      determining a correction value for correcting the injection amount of the first and second injectors based on a deviation of the actual injection amount from a predetermined target injection amount;
      correcting at least of said injection ratios based on the deviation; and
      actuating said second injector to perform fuel injection together with the first injector.

8. The system according to claim 7 wherein said controller increases the injection ratio of said second injector if the correction value indicates that said actual injection amount has a tendency to fall below said target injection amount.

9. The system according to claim 7 wherein said correction value is a learnt value in accordance with the tendency in the deviation which is constantly observed.

10. The system according to claim 7, wherein said controller corrects said injection ratios responsive to the correction value.

11. The system according to claim 10, wherein, if said learnt value is out of a predetermined range, said controller controls said injection ratio of said second injector based on the learnt value and resets said learnt value.

12. A method for controlling fuel injection in a combustion engine having cylinder and an intake passage connected to the cylinder, wherein a first injector injects fuel into the cylinder, a second injector injects fuel into the intake passage, and fuel injection by the first injector and the second injector is controlled based on a respectively predetermined injection ratio, said method comprising steps of:
   sensing an actual amount of fuel injected from said first injector;
   determining a deviation of the actual injection amount from a predetermined target injection amount;
   correcting at least of said injection ratios based on the deviation; and
   actuating said second injector to perform fuel injection together with the first injector.

* * * * *